United States Patent
Chen et al.

(10) Patent No.: US 7,038,457 B2
(45) Date of Patent: May 2, 2006

(54) CONSTRUCTING CO-LOCATED ANTENNAS BY WINDING A WIRE THROUGH AN OPENING IN THE SUPPORT

(75) Inventors: Kuo-Chiang Chen, Sugar Land, TX (US); Thomas D. Barber, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 75 days.

(21) Appl. No.: 10/250,225

(22) Filed: Jun. 13, 2003

(65) Prior Publication Data

US 2004/0017197 A1    Jan. 29, 2004

Related U.S. Application Data

(60) Provisional application No. 60/319,433, filed on Jul. 29, 2002.

(51) Int. Cl.
*G01V 3/28* (2006.01)

(52) U.S. Cl. ...................................................... 324/339
(58) Field of Classification Search ................ 324/334, 324/335, 338, 339, 343; 343/893; 702/7
See application file for complete search history.

(56) References Cited

U.S. PATENT DOCUMENTS

| | | |
|---|---|---|
| 3,187,252 A | 6/1965 | Hungerford |
| 3,609,521 A | 9/1971 | Desbrandes |
| 3,808,520 A | 4/1974 | Runge |
| 4,302,723 A | 11/1981 | Moran |
| 4,319,191 A | 3/1982 | Meador et al. |
| 4,360,777 A | 11/1982 | Segesman |
| 4,500,860 A * | 2/1985 | Vermilyea ................ 335/216 |
| 4,972,150 A | 11/1990 | Tabbagh |
| 5,115,198 A | 5/1992 | Gianzero et al. |
| 5,508,616 A | 4/1996 | Sato et al. |
| 5,699,048 A | 12/1997 | Galloway |
| 5,757,191 A | 5/1998 | Gianzero |
| 5,781,436 A | 7/1998 | Forgang et al. |
| 5,999,883 A | 12/1999 | Gupta et al. |
| 6,044,325 A | 3/2000 | Chakravarthy et al. |
| 6,181,138 B1 | 1/2001 | Hagiwara et al. |
| 6,393,364 B1 | 5/2002 | Gao et al. |
| 6,476,609 B1 | 11/2002 | Bittar |
| 2002/0080083 A1 | 6/2002 | Nantz et al. |
| 2002/0149997 A1 | 10/2002 | Zhang et al. |

(Continued)

FOREIGN PATENT DOCUMENTS

RU        1770932 A      10/1992

(Continued)

*Primary Examiner*—Edward Lefkowitz
*Assistant Examiner*—Reena Aurora
(74) *Attorney, Agent, or Firm*—Kevin P. McEnaney; Victor H. Segura; Bryan L. White

(57) ABSTRACT

Techniques for implementing antenna configurations with substantially co-located axes are disclosed. A method for constructing co-located antennas includes winding a first antenna on a support, the first antenna having a first magnetic dipole in a first orientation; and winding a second antenna on the support through a first set of openings in the support, the second antenna having a second magnetic dipole in a second orientation, wherein the first orientation is different from the second orientation, and wherein a center of the first magnetic dipole substantially co-locates with a center of the second magnetic dipole.

11 Claims, 5 Drawing Sheets

FRONT VIEW

SIDE VIEW

U.S. PATENT DOCUMENTS

2002/0173913 A1 11/2002 Tabarovsky et al.
2002/0186013 A1 12/2002 Tabarovsky et al.
2003/0229450 A1 12/2003 Strickland

FOREIGN PATENT DOCUMENTS

WO  WO 01/41319 A1  6/2001

* cited by examiner

CONSTRUCTING CO-LOCATED ANTENNAS BY WINDING A WIRE THROUGH AN OPENING IN THE SUPPORT

CROSS REFERENCE TO RELATED APPLICATIONS

This invention claims priority pursuant to 35 U.S.C. Â§119 of U.S. Provisional Patent Application Ser. No. 60/319,433, filed on Jul. 29, 2002. This Provisional Application is hereby incorporated by reference in its entirety.

BACKGROUND OF INVENTION

1. Field of the Invention

The invention relates generally to electromagnetic well logging instruments. More specifically, the invention relates to antennas for electromagnetic well logging instruments.

2. Background Art

Various well logging techniques are known in the field of oil and gas exploration and production. These techniques typically employ logging tools or "sondes" equipped with sources adapted to emit energy into subsurface formations from a borehole traversing the subsurface formations. The emitted energy interacts with the surrounding formations to produce signals that are then detected by one or more sensors on the logging tools. By processing the detected signals, a profile of the formation properties may be obtained.

Electrical conductivity (or its inverse, resistivity) is an important property of subsurface formations in geological surveys and prospecting for oil, gas, and water because many minerals, and more particularly hydrocarbons, are less conductive than common sedimentary rocks. Thus, measurement of formation conductivity (or resistivity) provides a useful guide to the presence and amount of oil, gas, or water.

Formation resistivity properties are typically measured with electromagnetic (EM) induction or propagation logging tools. These tools are generally referred to as EM logging tools in this description, regardless of whether it is an induction tool or a propagation tool. EM logging methods are based on the principle that time-varying electric currents in a coil (or antenna) produce time-varying magnetic fields, which then induce electric currents (eddy currents) in the conductive surroundings. The eddy currents in turn induce secondary magnetic fields that can induce voltages in detector coils.

Conventional EM logging instruments/tools typically use one or more longitudinally-spaced transmitter antennas operating at one or more frequencies to induce eddy currents at different depth of investigation (i.e., different distances into the formation from the borehole). These tools typically also include a plurality of receiver antennas that are spaced apart from the transmitter antennas along the tool axes. As noted above, the receiver antennas detect the secondary magnetic fields that are induced by the eddy currents in the formation. The magnitudes of the induced signals at the receiver antennas vary with the formation conductivities or resistivities. The signals detected at the receiver antenna are typically expressed as a complex number (phasor voltage). Formation resistivities can then be derived from the phase shift ($\overline{i}\square$) and amplitude difference (A) as measured by different receiver antennas disposed at different distances from the transmitter antenna.

The magnetic moment m of a coil or antenna may be represented as a vector, oriented in a direction parallel to the induced magnetic dipole. The magnetic moment has a magnitude proportional to the magnetic flux, which is a function of the area of the coil, the number of turns of the coil, and the amplitude of the current passing through the coil. Conventional EM instruments have antennas consisting of coils mounted on the instruments with their magnetic dipoles parallel to the instrument's longitudinal axis. These instruments thus have longitudinal magnetic dipole (LMD) moments. The LMD induces eddy currents in loops lying in planes perpendicular to the tool or well axis.

When analyzing stratified earth formations, the responses of EM logging instruments are strongly influenced by the conductive layers parallel to the plane of the eddy currents. In contrast, nonconductive layers interleaved between the conductive layers do not contribute substantially to the detected signals. Therefore, the existence of the nonconductive layers are often masked by the conductive layers and become undetectable by conventional EM logging instruments. This poses a significant problem because the nonconductive layers often are rich in hydrocarbons and their identification is the object of logging operations.

Methods have been proposed to detect nonconductive layers located within conductive layers. For example, U.S. Pat. No. 5,781,436 issued to Forgang et al. describes a method using EM logging instruments with at least one coil having its magnetic dipole axis oriented away from the longitudinal axis of the tool. Such antennas are referred to as tilted or transverse magnetic dipole (TMD) antennas. Other EM logging tools equipped with TMD antennas may be found in U.S. Pat. Nos. 4,319,191, 5,508,616, 5,757,191, 5,781,436, 6,044,325, and 6,147,496. A TMD tool may induce and/or detect eddy currents that flow in loops on planes not perpendicular to the tool or well axis. If a nonconductive layer interrupts such loops (e.g., the nonconductive layer intercepts the eddy current loops at an angle), the detected signals will be significantly impacted, making it possible to detect the existence or location of the nonconductive layers.

Conventional EM logging tools are implemented with antennas that are operable as sources (transmitters) and/or detectors (receivers). One of ordinary skill in the art would appreciate that the transmitter and receiver coils (antennas) have the same characteristics and a coil or antenna may be used as a transmitter at one time and as a receiver at another. In these conventional EM logging tools, whether TMD or LMD tools, the antennas are typically mounted on the mandrel or support member and spaced apart from each other along the longitudinal axis of the tool. This configuration is necessary because constructing solenoid coils with their axes perpendicular to the tool axis (e.g., TMD) requires a considerable amount of space within the logging instrument.

Figure 1:
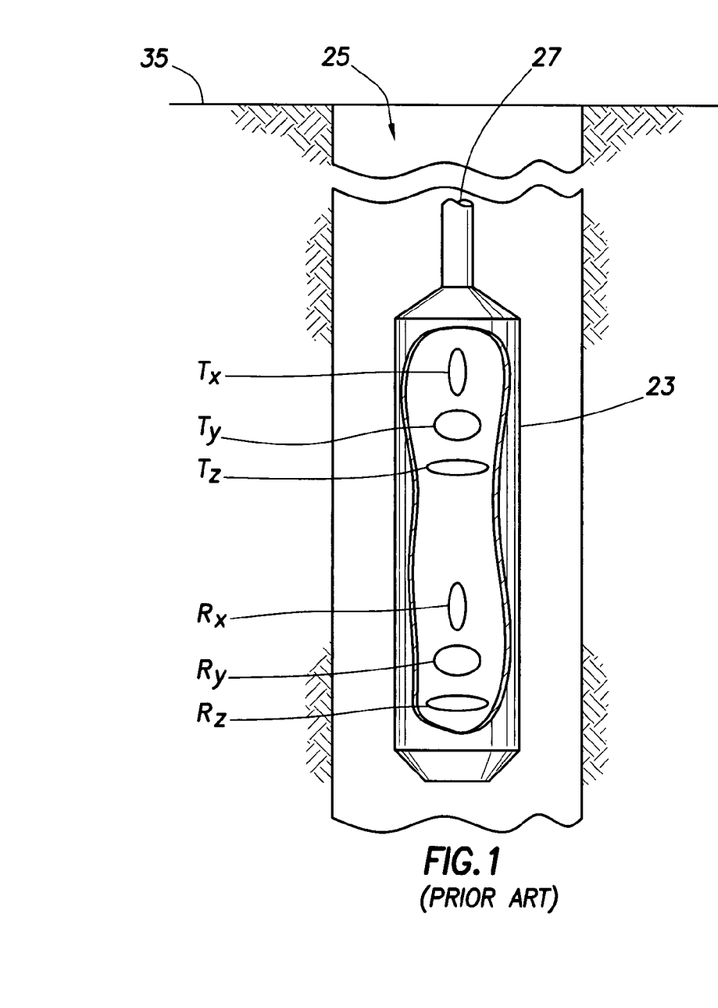
FIG. 1 shows a prior art tri-axial EM logging tool.

FIG. 1 shows a conventional tri-axial EM logging tool having magnetic dipole antennas oriented in orthogonal directions. As shown in FIG. 1, the tri-axial EM logging tool has three transmitter antennas ($T_x$, $T_y$, and $T_z$) spaced apart along, the axis of the tool and three receiver antennas ($R_x$, $R_y$, and $R_z$) disposed at a distance from the transmitter antennas. The receiver antennas are also spaced apart from each other along the tool axis. Because these antennas are all spaced apart along the tool axis, they would respond to different volumes in the formation. Consequently, conventional resistivity measurement data inherently include measurement errors.

To overcome this problem, it is desirable to have an EM logging tool having a plurality of antennas with their magnetic dipoles co-located at a common location such that they are responsive to the same volume in the formation. U.S. Pat. No. 3,808,520 issued to Runge discloses a triple coil antenna assembly, in which three antennas are arranged in orthogonal directions on a spherical support. However, this spherical support and antennas need to be accommodated inside the cavity of the mandrel. Because the interior space of a mandrel is very limited, the diameter of the spherical support is also limited. This in turn limits the area of the coils, hence the magnitudes of the achievable magnetic moments.

There remains a need for better techniques to implement EM logging tools having co-located antennas with different magnetic dipole orientations.

SUMMARY OF INVENTION

One aspect of the invention provides a method for constructing co-located antennas. The method includes winding a first antenna on a support, the first antenna having a first magnetic dipole in a first orientation; and winding a second antenna on the support through a first set of openings in the support, the second antenna having a second magnetic dipole in a second orientation, wherein the first orientation is different from the second orientation, and wherein a center of the first magnetic dipole substantially co-locates with a center of the second magnetic dipole.

Another aspect of the invention provides an antenna assembly. The assembly includes a plurality of antennas formed on a support, wherein the plurality of antennas having centers of their magnetic dipoles substantially co-located, and wherein at least one of the plurality of antennas is formed by winding a wire through an opening in the support.

Another aspect of the invention provides a logging tool. The tool includes a tool body; a first antenna assembly formed on the tool body; and a second antenna assembly formed on the tool body and spaced apart from the first antenna assembly along a longitudinal axis of the logging tool, wherein the first antenna assembly comprises a plurality of antennas having centers of their magnetic dipoles substantially co-located, and wherein at least one of the plurality of antennas is formed on the tool body by winding a wire through openings in the tool body.

Other aspects and advantages of the invention will be apparent from the following description and the appended claims.

DETAILED DESCRIPTION

Embodiments of the invention relate to methods for assembling antennas on logging instruments adapted for subsurface measurements. Some embodiments of the invention relate to EM logging tools having antenna assemblies comprising multiple coils with co-located magnetic dipoles. Embodiments of the invention have general applications in the oilfield and subsurface exploration industry, but their applications are not limited to any particular discipline or industry.

EM logging tools are well known in the art. FIG. 1 shows a prior art tri-axial EM logging tool (23) lowered into a well (25) by a wireline (27). The EM logging tool (23) includes tri-axial transmitter antennas ($T_x$, $T_y$, and $T_z$) disposed at different locations along the longitudinal axis of the EM logging-tool (23). The tri-axial transmitter antennas ($T_x$, $T_y$, and $T_z$) have their magnetic dipoles oriented in orthogonal directions relative to each other. The EM logging tool (23) also includes tri-axial receiver antennas ($R_x$, $R_y$, and $R_z$) disposed at different locations along the longitudinal axis of the EM logging tool (23). The tri-axial receiver antennas ($R_x$, $R_y$, and $R_z$) also have their magnetic dipoles oriented orthogonal to each other, and typically in the same orthogonal orientations as those of the transmitter antennas. As noted above, the transmitter antennas ($T_x$, $T_y$, and $T_z$) and the receiver antennas ($R_x$, $R_y$, and $R_z$) are spaced apart along the axis of the tool. This configuration necessarily means that the various antennas are responsive to different volumes in the formation. As a result, formation resistivity (or conductivity) derived from signals detected by various receiver antennas in a conventional tri-axial EM logging tool inherently includes errors.

Figure 2:
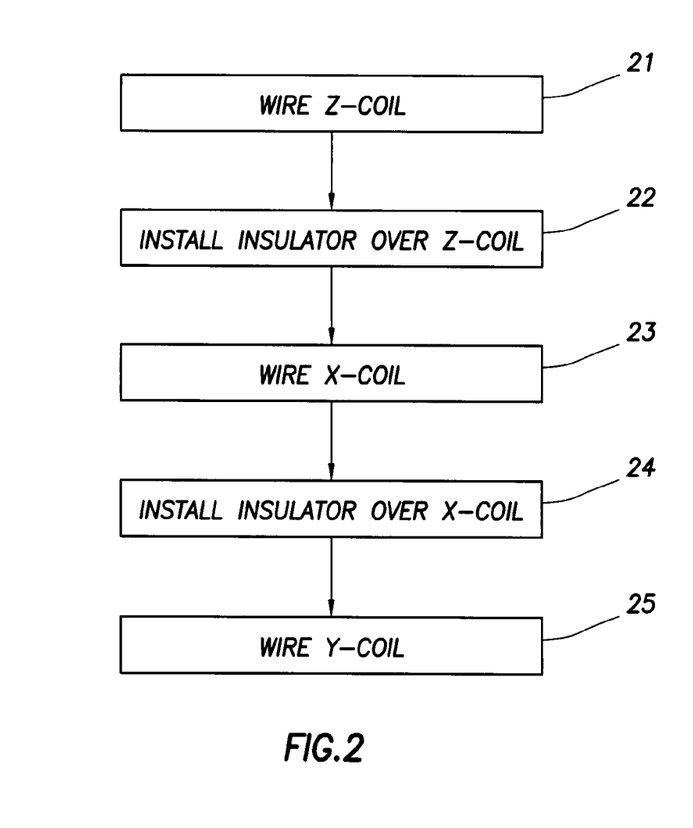
FIG. 2 shows a method for constructing co-located antennas in accordance with one embodiment of the invention.

Embodiments of the invention relate to methods for constructing EM logging tools having co-located antenna assemblies. FIG. 2 shows a method for constructing a co-located tri-axial antenna assembly in accordance with embodiments of the invention. First, the z-direction coil (z-coil) is wired/wound around the mandrel (tool body) (step 21). The "z-direction coil" or "z-coil" as used herein refers to a coil having the orientation of its magnetic dipole in the z-direction. An optional insulator material may then be placed over the z-coil (step 22). Afterwards, the x-direction coil is wired (wound) on top of the z-coil or the insulator in a way such that the center of the x-coil substantially co-locates with the center of the z-coil (step 23). In order to route the x-coil, the wires are run through a set of slots (or holes) on the wall of the instrument. Again, an optional insulator material may be placed over the x-coil (step 24). Next, the y-coil is wired in a similar fashion, i.e., the wires of y-coils are run through another set of slots (or holes) (step 25). Again, the center of the y-coil is preferably at substantially the same location as those of the z- and x-coils. This will produce a co-located tri-axial antenna assembly. The above procedures are for illustration only. One of ordinary skill in the art would appreciate that the sequence of wiring the x-, y-, and z-coils may be altered without departing from the scope of the invention. These steps will now be described in detail with to the associated figures.

Figure 3:
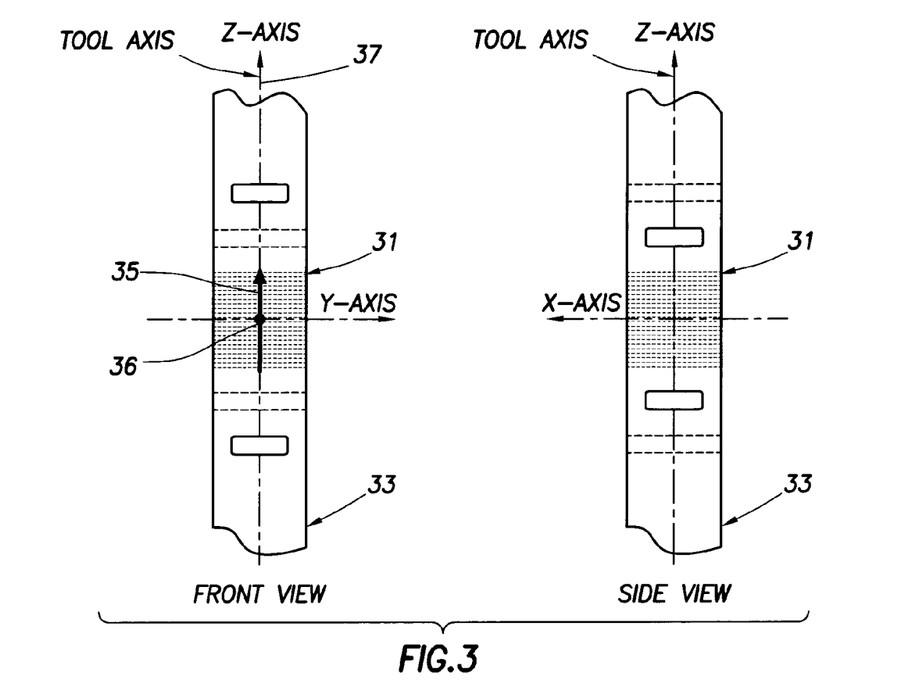
FIG. 3 shows a configuration of a z-coil in accordance with one embodiment of the invention.

FIG. 3 shows the z-coil (31) wired on the mandrel (tool body)(33) of an EM logging tool in accordance with embodiments of the invention. The z-coil (31) may be windings of an insulated wire known in the art. The number of turns of the wire would depend on the desired magnitude of the magnetic moment. As shown, the magnetic dipole (35) of the z-coil is aligned with the tool axis (37) (z-direction), and the center (36) of the magnetic dipole (35) is substantially at the center of the cylindrical segment circumscribed by the z-coil (31).

Figure 4:
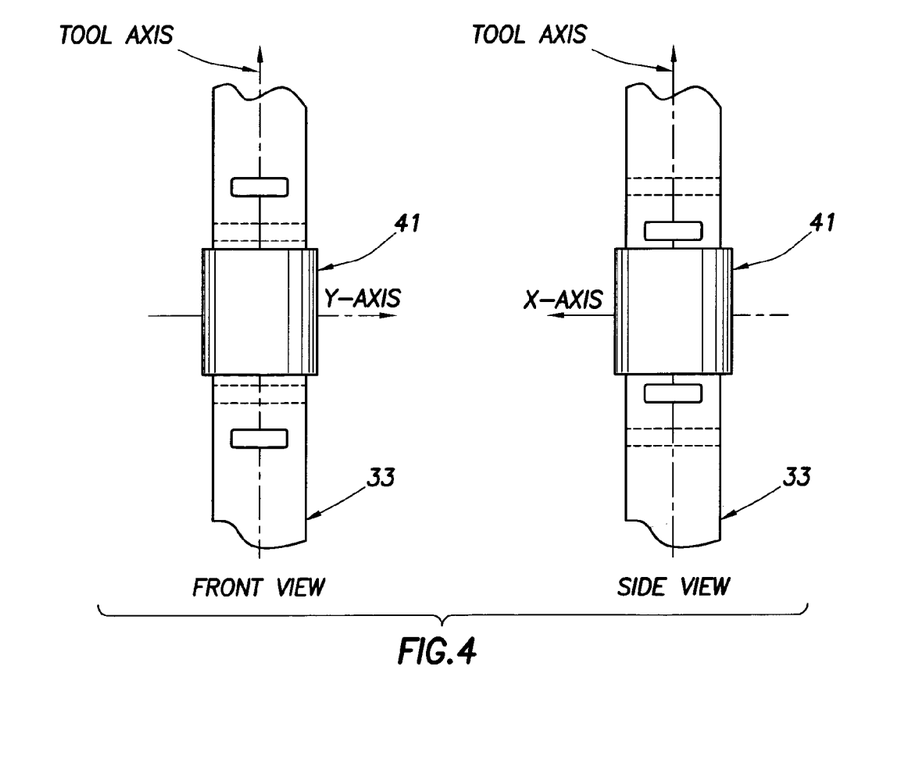
FIG. 4 shows an insulator disposed over a z-coil in accordance with one embodiment of the invention.

Once the z-coil is in place, either the x-coil or the y-coil may then be wired (wound) on the tool. To improve the structure integrity and to ensure insulation between the coils, an insulator or stabilizing insert may be placed over the z-coil before wiring the x- or y-coil. FIG. 4 shows an embodiment of a stabilizing insert (insulator) (41) disposed over the z-coil (not shown) to provide stability for the x-coil that is to be wired next and to prevent interference between the adjacent coils. Note that the stabilizing insert (41) is optional because the wires used to construct the coils are typically insulated wires and thus no additional insulator would be necessary. The stabilizing insert (41) may be formed of any suitable material having appropriate insulating properties to prevent shorting between the coils yet allowing for the passage of electromagnetic energy therethrough. The inserts are preferably non-magnetic and should provide good thermal stability. Suitable insert materials, for example, may include ceramic, plastics, resins, fiberglass, and the like. Other embodiments may be implemented with magnetic materials (e.g. ferrite) disposed near or within the inserts (41) to alter the moment strength as known in the art (not shown). The inserts may be formed as a single piece or multi-piece units (not shown). If a one-piece insert is used, it may be slid onto the mandrel (33) and over the desired antenna.

Figure 5:
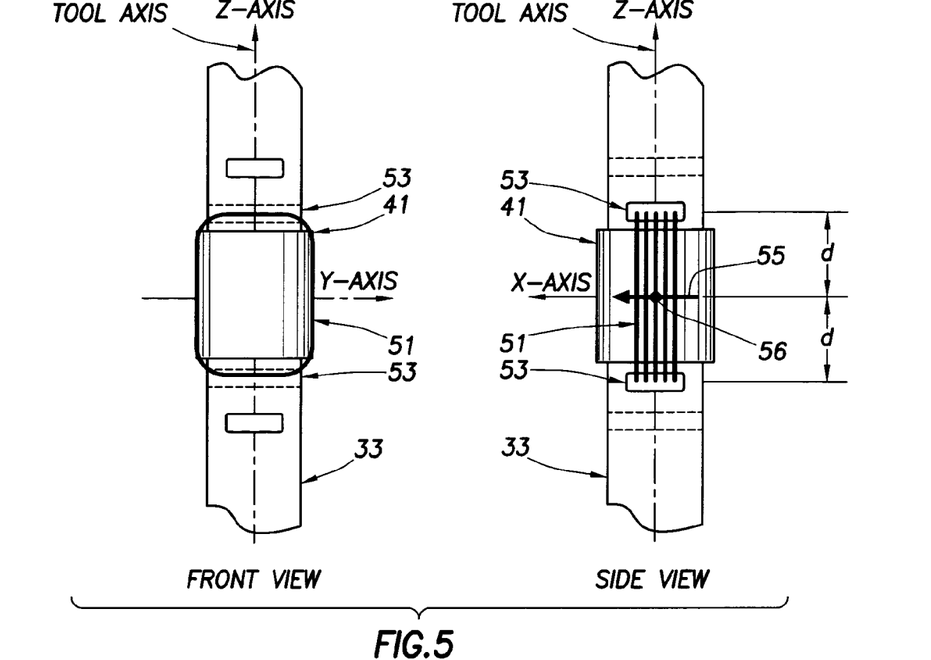
FIG. 5 shows a configuration of an x-coil in accordance with one embodiment of the invention.

FIG. 5 shows that the x-coil (51) is then wired on top of the first stabilizing insert (insulator) (41). The wiring is through a first set of slots (holes) (53) on the mandrel (33). The distance between the slots (53) would affect the area of the coils. Because the area of the coils and the number of turns of the wire determine the magnitude of the magnetic dipole, one can judicially select the distance between the slots and the number of turns of the coil to obtain a desired magnitude of the magnetic dipole. For example, in a preferred embodiment, the magnetic moment of the x-coil may be matched with that of the z-coil. The center (56) of the magnetic dipole (55) of the x-coil is preferably positioned so that it substantially co-locates with the center of the z-coil. According to embodiments of the invention, to have the center (56) of the magnetic dipole (55) of the x-coil co-locate with the center of the z-coil, it is only necessary to have the slots (53) disposed at an equal distance (d) from the center of the z-coil.

Figure 6:
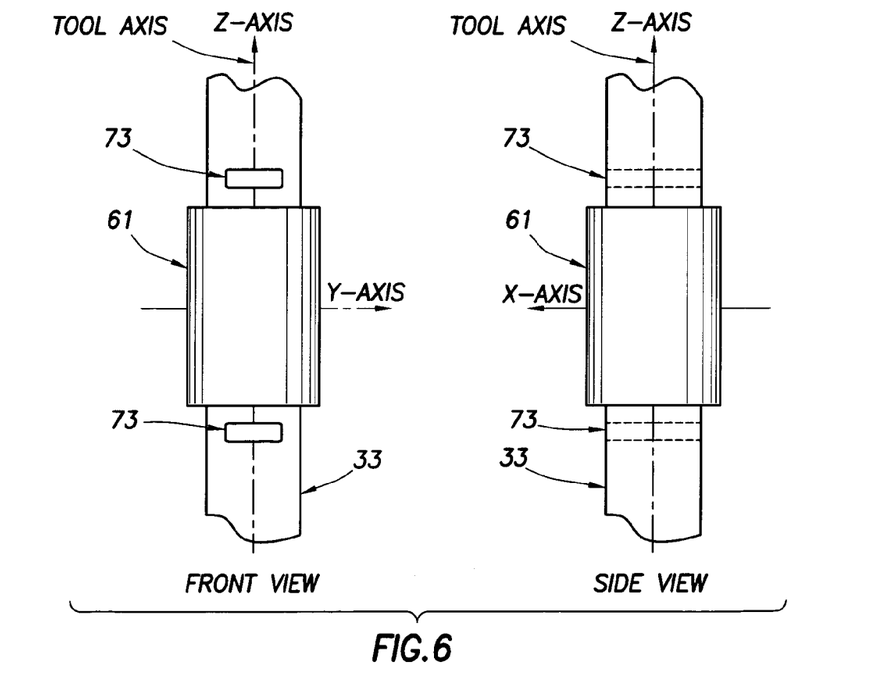
FIG. 6 shows a second insulator disposed over an x-coil in accordance with one embodiment of the invention.

FIG. 6 shows a second stabilizing insert (insulator) (61) disposed over the x-coil (not shown) to provide stability of the y-coil that is to be wired next and to prevent interference between the adjacent coils. Note that the second stabilizing insert (61) is optional. In some embodiments, the second stabilizing insert (61) may be omitted because the wires used in the construction of the antennas are insulated and no further insulation is required. Again, the second stabilizing insert (61) may be a single piece construction that slides over the mandrel (33) or a multi-piece construction (not shown).

Figure 7:
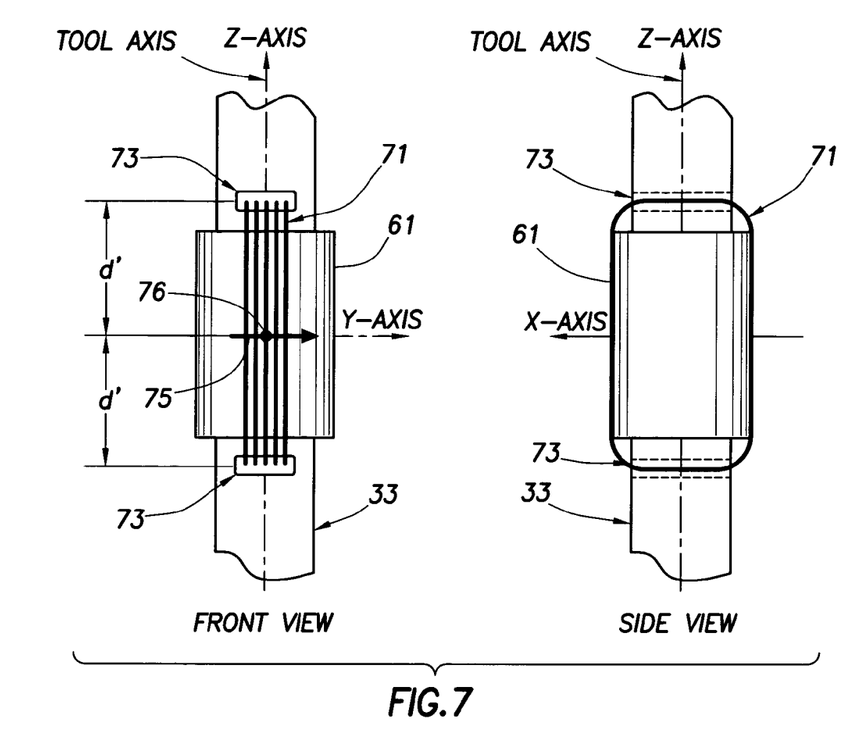
FIG. 7 shows a configuration of a y-coil in accordance with one embodiment of the invention.

FIG. 7 shows the y-coil (71) wired on top of the second stabilizing insert (61) and through a second set of slots (holes) (73) on the mandrel (33). Again, the distance between the slots (73) and the number of the turns of the coil can be judicially selected to obtain the desired magnitude of the magnetic dipole. The center (76) of the magnetic dipole (75) of y-coil is preferably positioned so that it substantially co-locates with those of the z-coil and the x-coil. Again, to have the center (76) of the magnetic dipole (75) of the y-coil co-locate with the centers of the z-coil and x-coil, it is only necessary to have the slots (73) disposed at an equal distance (d") from the center of the z-coil.

The above description illustrates one method according to embodiments of the invention. One of ordinary skill in the art would appreciate that other modifications are possible without departing from the scope of the invention. For example, the wiring sequence of the z-, x-, and y-coils can be altered, and the x-coil and y-coil magnetic dipole orientations, as shown in the above description, may form an angle less than or more than 90 degrees. In addition, methods of the invention may be used to construct antennas other than tri-axial antennas.

Figure 8:
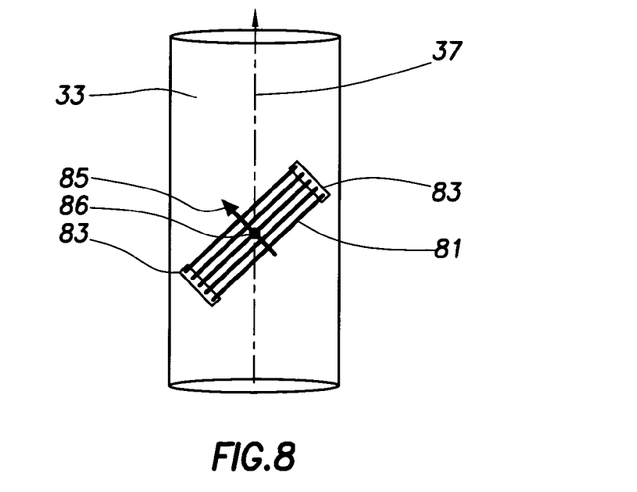
FIG. 8 shows a tilted antenna in accordance with one embodiment of the invention.

Embodiments of the invention may also be used to construct tilted antennas. FIG. 8 illustrates a tilted antenna having a coil (81) wired through a set of slots (83) in a slanted orientation relative to the axis (37) of the mandrel (33). The antenna shown in FIG. 8 would have a magnetic dipole (85) oriented in the XZ or YZ direction, while maintaining the center (86) of the magnetic dipole (85) substantially co-located with that of the z-coil.

While the above example shows a method for the construction of antennas of the solenoid type, methods of the invention may also be used to construct loop antennas. Furthermore, the above example shows that the x-coil, y-coil, and z-coil are wound on the surface of the mandrel. One of ordinary skill in the art would appreciate that these coils may be wound in troughs or indents carved in the wall of the tool such that the finished antennas are flush with the outside surface of the tool body.

Some embodiments of the invention relate to apparatus having antenna assemblies that have co-located magnetic dipoles. "Co-locate" as used in this description refers to a configuration in which the centers of the magnetic dipoles of the antennas are substantially at the same location. An antenna assembly in accordance with the invention comprises antennas having matched (co-located) centers of magnetic dipoles. One such configuration, for example a tri-axial antenna, includes coils having magnetic dipoles oriented in three mutually orthogonal directions (x, y, z). However, embodiments of the invention are not limited to conventional tri-axial antennas. Instead, an EM logging tool in accordance with the invention may include transverse or tilted antennas that are not necessarily orthogonal to each other. The co-located antennas in accordance with the invention may be included in an EM induction or propagation tool, which may be a wireline, a logging-while-drilling (LWD), a measurement-while-drilling (MWD), or a logging-while-tripping (LWT) tool.

Figure 9:
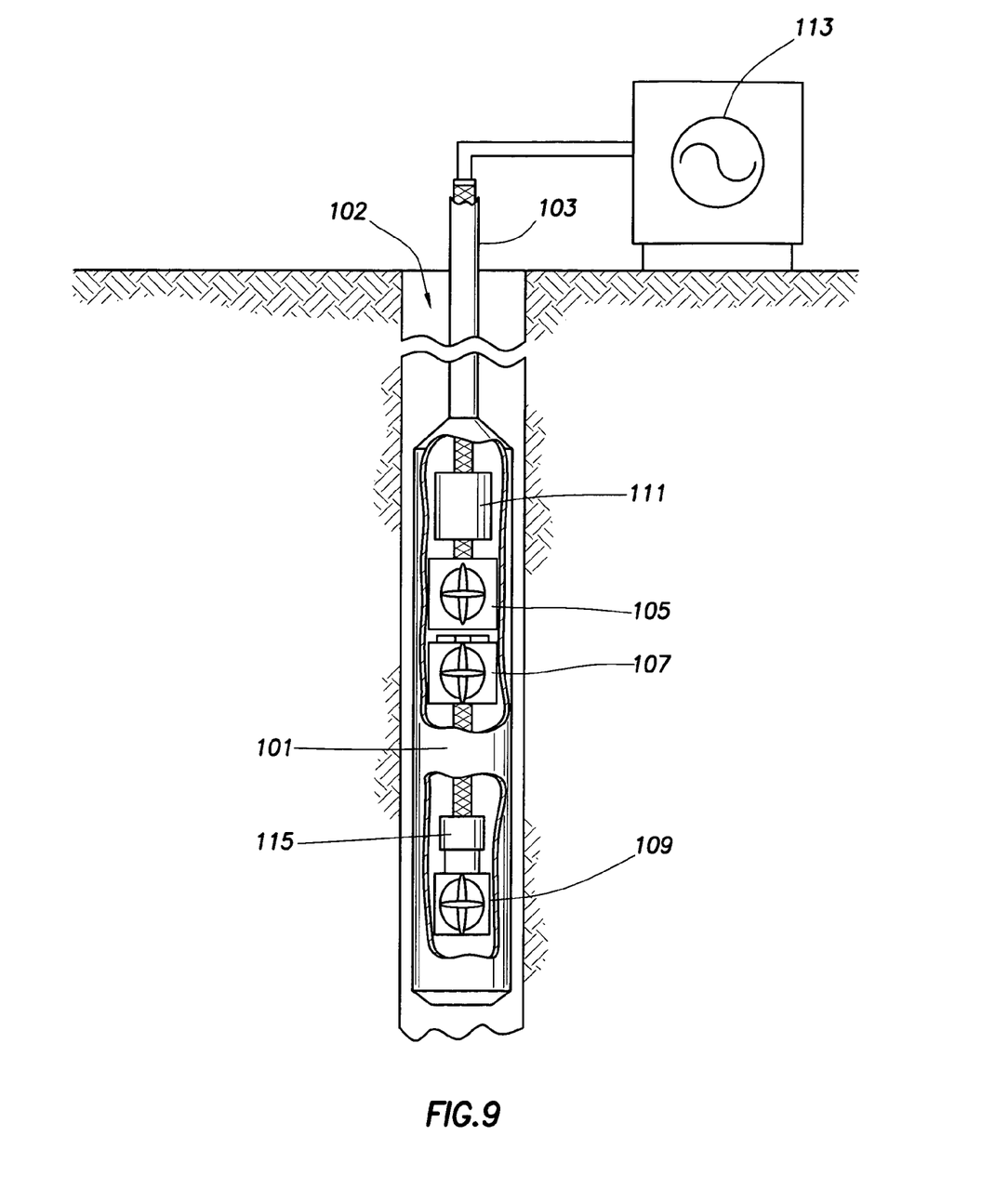
FIG. 9 shows an EM logging tool in accordance with one embodiment of the invention.

FIG. 9 shows an EM induction or propagation logging tool (101), in accordance with one embodiment of the invention, lowered in a well (102) by a wireline-(103). The EM logging tool (101) includes a transmitter antenna assembly (105) and a receiver antenna assembly (109), each of which includes a set of co-located tri-axial coils (antennas). The EM logging tool (101) may optionally include a bucking coil/antenna (107) to reduce the undesired communication between the transmitter antenna assembly (105) and the receiver antenna assembly (109). A transmitter electronic circuitry (111) is connected to the transmitter antenna assembly (105) to provide the time-varying electric currents to induce the time-varying magnetic fields. A receiver circuitry (115) is connected to the receiver antenna assembly (109) to detect the induced voltages. A power supply (113) provides power to the electronic circuitry (111) and the receiver circuitry (115). Note that the description of transmitter and receiver is for clarity. One of ordinary skill in the art would appreciate that the functions of these antennas may be reversed. Furthermore, although a wireline EM logging tool is shown in FIG. 9, embodiments of the invention may also be used in an LWD, MWD, or LWT EM logging tool.

FIG. 9 illustrates an EM logging tool having only one transmitter antenna assembly and one receiver antenna assembly. However, embodiments of the invention are not so limited. In fact, most EM logging tools have at least two sets of receivers or receiver assemblies. In this case, the two sets of receiver assemblies are spaced apart from each other along the tool axis such that they are at different distances from the transmitter assembly. In some embodiments, EM logging tools may also include two or more sets of the transmitter assemblies.

Advantages of the invention may include the following. Embodiments of the invention as illustrated above are generally applicable to the construction of co-located antennas for both EM induction and propagation tools. The co-located antennas permit investigation of the same volume of the formation. Embodiments of the invention provide convenient methods for constructing co-locating antennas, i.e., by properly locating the first and second sets of slots at equal distances form the center of the z-coil. Methods of the invention may be used to construct antennas on a tool of any size and shape, not limited by the inside dimension of the mandrel.

While the invention has been described with respect to a limited number of embodiments, those skilled in the art, having benefit of this disclosure, will appreciate that other embodiments can be devised which do not depart from the scope of the invention as disclosed herein. For example, the disclosed antenna configurations may be implemented with practically any logging technique in the market, including coiled tubing, wireline, while-drilling, and while-tripping applications.

What is claimed is:

1. An antenna assembly formed on a tool body diposed in a well, comprising a plurality of antennas formed on the tool body the plurality of antennas having centers of their magnetic dipoles substantially co-located, and wherein at least one of the plurality of antennas is formed by winding a wire through an opening in the tool body.

2. The antenna assembly of claim 1, wherein the plurality of antennas comprise three antennas having their magnetic dipoles in mutually orthogonal orientations.

3. A logging tool, comprising:
a tool body;
a first antenna assembly formed on the tool body; and
a second antenna assembly formed on the tool body and spaced apart from the first antenna assembly along a longitudinal axis of the logging tool, wherein the first antenna assembly comprises a plurality of antennas having centers of their magnetic dipoles substantially co-located, and wherein at least one of the plurality of antennas is formed on the tool body by winding a wire through openings in the tool body.

4. The logging tool of claim 3, wherein the plurality of antennas of the first antenna assembly comprise three antennas having their magnetic dipoles in mutually orthogonal orientations.

5. The logging tool of claim 4, wherein the second antenna assembly comprises a plurality of antennas having centers of their magnetic dipoles substantially co-located.

6. The logging tool of claim 5, wherein the plurality of antennas of the second antenna assembly comprise three antennas having their magnetic dipoles in mutually orthogonal orientations.

7. The logging tool of claim 6, further comprising a third antenna assembly formed on the tool body and spaced apart from the first antenna assembly and the second antenna assembly along a longitudinal axis of the logging tool.

8. The logging tool of claim 7, wherein the third antenna assembly comprises a plurality of antennas having centers of their magnetic dipoles substantially co-located.

9. The logging tool of claim 8, wherein the plurality of antennas of the third antenna assembly comprise three antennas having their magnetic dipoles in mutually orthogonal orientations.

10. The logging tool of claim 3, further comprising a bucking antenna disposed between the first antenna assembly and the second antenna assembly.

11. The logging tool of claim 3, wherein the logging tool is part of a wireline tool, a logging-while-drilling tool, a measurement-while-drilling tool, or a logging-while-tripping tool.

* * * * *